US011080592B2

(12) United States Patent
Wozniak et al.

(10) Patent No.: US 11,080,592 B2
(45) Date of Patent: Aug. 3, 2021

(54) NEUROMORPHIC ARCHITECTURE FOR FEATURE LEARNING USING A SPIKING NEURAL NETWORK

(71) Applicant: International Business Machines Corporation, Armonk, NY (US)

(72) Inventors: Stanislaw A. Wozniak, Adliswil (CH); Angeliki Pantazi, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 15/725,320

(22) Filed: Oct. 5, 2017

(65) Prior Publication Data
US 2019/0108434 A1 Apr. 11, 2019

(51) Int. Cl.
*G06N 3/04* (2006.01)
*G06N 20/00* (2019.01)

(52) U.S. Cl.
CPC ............ *G06N 3/049* (2013.01); *G06N 20/00* (2019.01)

(58) Field of Classification Search
CPC ............................... G06N 3/049; G06N 20/00
See application file for complete search history.

(56) References Cited

U.S. PATENT DOCUMENTS

| | | | |
|---|---|---|---|
| 9,111,215 B2 | 8/2015 | Piekniewski | |
| 9,183,493 B2 | 11/2015 | Richert et al. | |
| 9,195,934 B1 | 11/2015 | Hunt et al. | |
| 9,311,594 B1 | 4/2016 | Fisher et al. | |
| 10,846,595 B2 * | 11/2020 | Wild | G06N 3/006 |
| 2010/0312730 A1 * | 12/2010 | Weng | G06N 3/08 706/15 |
| 2013/0159232 A1 * | 6/2013 | Rhodes | G06N 3/063 706/27 |
| 2013/0325777 A1 * | 12/2013 | Petre | G06N 3/049 706/26 |
| 2016/0004961 A1 | 1/2016 | Appuswamy et al. | |

OTHER PUBLICATIONS

Afshar et al., "Racing to Learn: Statistical Inference and Learning in a Single Spiking Neuron with Adaptive Kernels", The MARCS Institute, Bioelectronics and Neuroscience, University of Western Sydney, 29 pages, Front. Neurosci., Nov. 2014.

Lee et al., "CONE: Convex-Optimized-Synaptic Efficacies for Temporally Precise Spike Mapping", IEEE Transactions on Neural Networks and Learning Systems, vol. 28, No. 4, Apr. 2017, 13 pages, DOI: 10.1109/TNNLS.2015.2509479.

(Continued)

*Primary Examiner* — Alan Chen
(74) *Attorney, Agent, or Firm* — Scott S. Dobson

(57) ABSTRACT

A neuromorphic architecture for a spiking neural network comprising a plurality of spiking neurons, each with a plurality of synapses and corresponding synaptic weights, the architecture further comprising a synaptic competition mechanism in connection with a spike-based learning mechanism based on spikes perceived behind a synapse, in which architecture synapses of different neurons connected to the same input compete for that input and based on the result of that competition, each neuron of the neural network develops an individual perception of the presented input spikes, the perception used by the learning mechanism to adjust the synaptic weights.

10 Claims, 14 Drawing Sheets

(56) References Cited

OTHER PUBLICATIONS

Diehl et al., "Unsupervised learning of digit recognition using spike-timing-dependent plasticity", Front. Comput. Neurosci., Aug. 3, 2015, https://doi.org/10.3389/fncom.2015.00099, 9 pages.
Hinton et al., "Improving neural networks by preventing co-adaptation of feature detectors", Department of Computer Science, University of Toronto, Jul. 3, 2012, 18 pages.
Wozniak et al., "Learning Spatio-Temporal Patterns in the Presence of Input Noise using Phase-Change Memristors", 2016 IEEE International Symposium on Circuits and Systems (ISCAS), ©2016 IEEE, 4 pages, DOI: 10.1109/ISCAS.2016.7527246.
Sajikumar et al., "Competition between recently potentiated synaptic inputs reveals a winner-take-all phase of synaptic tagging and capture", PNAS, Aug. 19, 2014, vol. 111, No. 33, www.pnas.org/cgi/doi/10.1073/pnas.1403643111, 5 pages.
Shouval et al., "Spike timing dependent plasticity: a consequence of more fundamental learning rules", Front. Comput. Neurosci., Jul. 1, 2010, vol. 4, Article 19, https://doi.org/10.3389/fncom.2010.00019, 13 pages.
Huang et al., "Parallel Ensemble of Online Sequential Extreme Learning Machine Based on MapReduce", Proceedings of ELM-2014 vol. 1, Copyright Springer International Publishing Switzerland 2015, Proceedings in Adaptation, Learning and Optimization 3, DOI: 10.1007/978-3-319-14063-6_3, 34 pages.
Lazzaro et al., "Winner-take-all networks of O(N) complexity", Advances in neural information processing systems 1, pp: 703-711, Morgan Kaufmann Publishers Inc. San Francisco, CA, USA ©1989, ISBN:1-558-60015-9.

\* cited by examiner

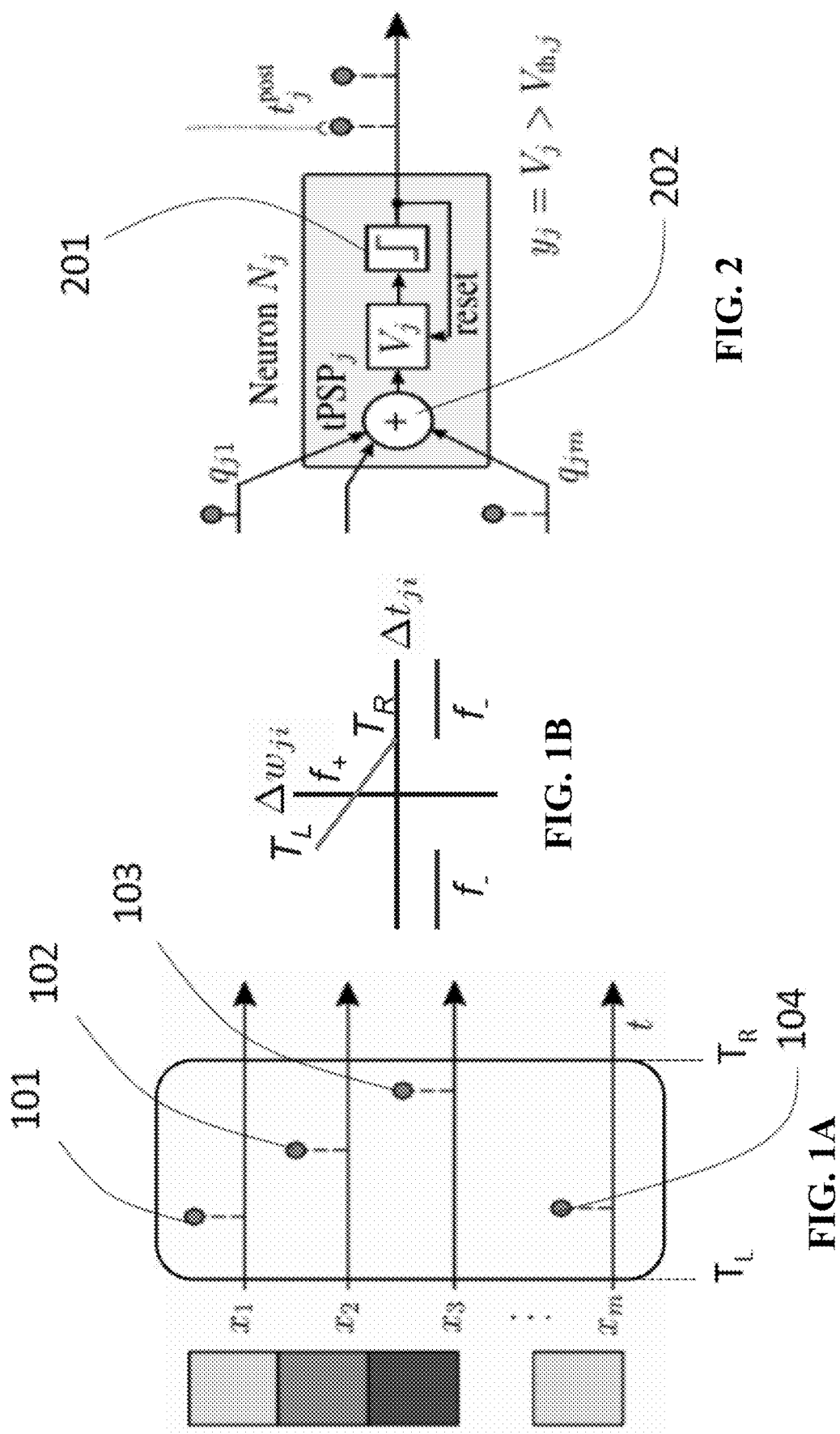

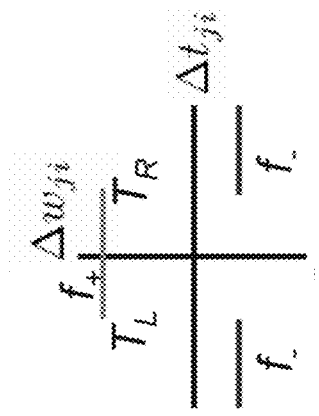
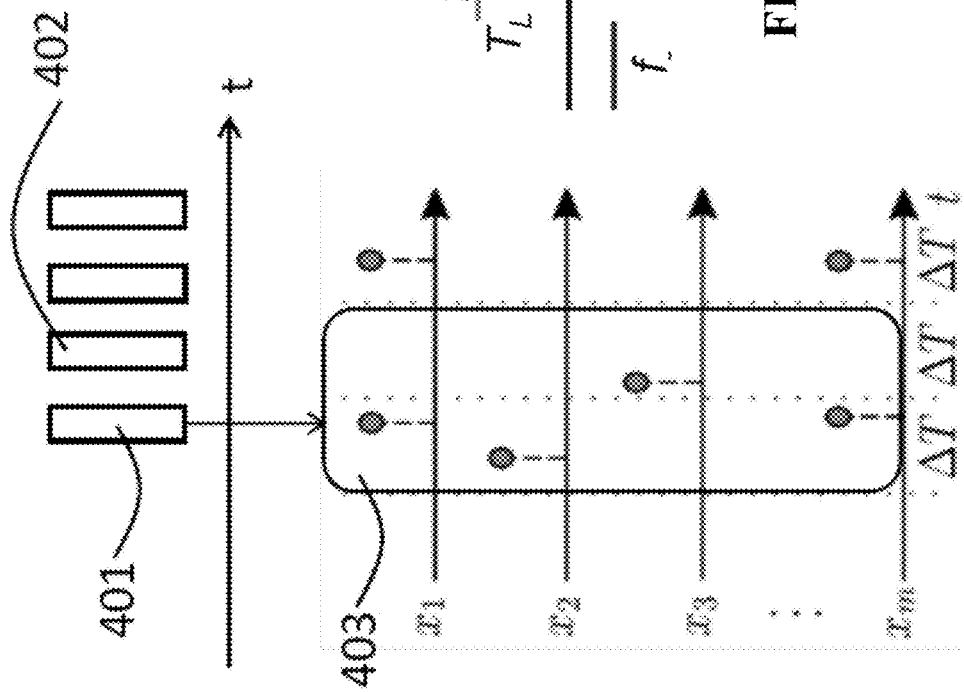
FIG. 4A
FIG. 4B
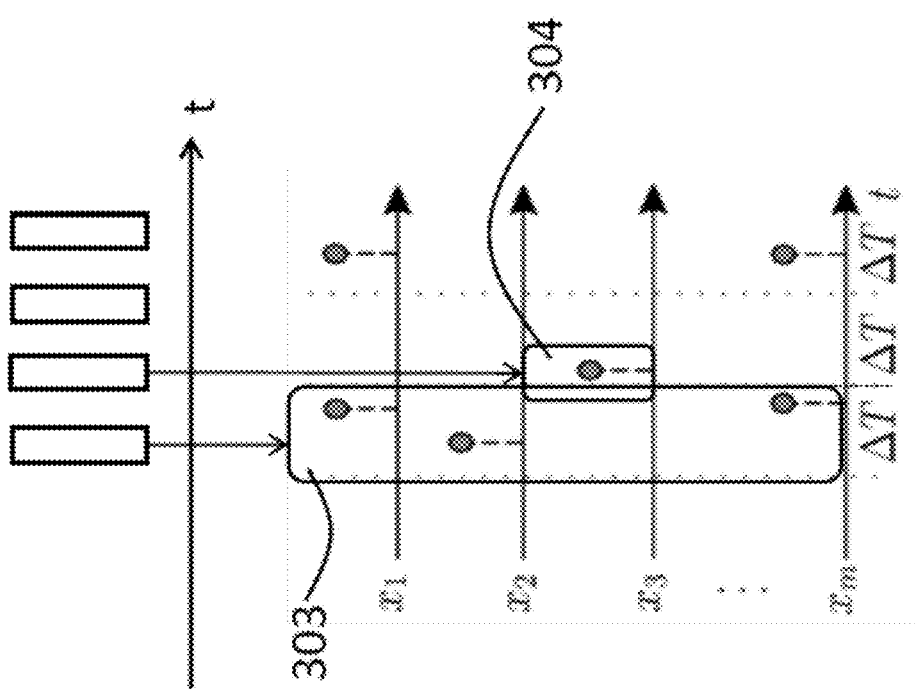
FIG. 3

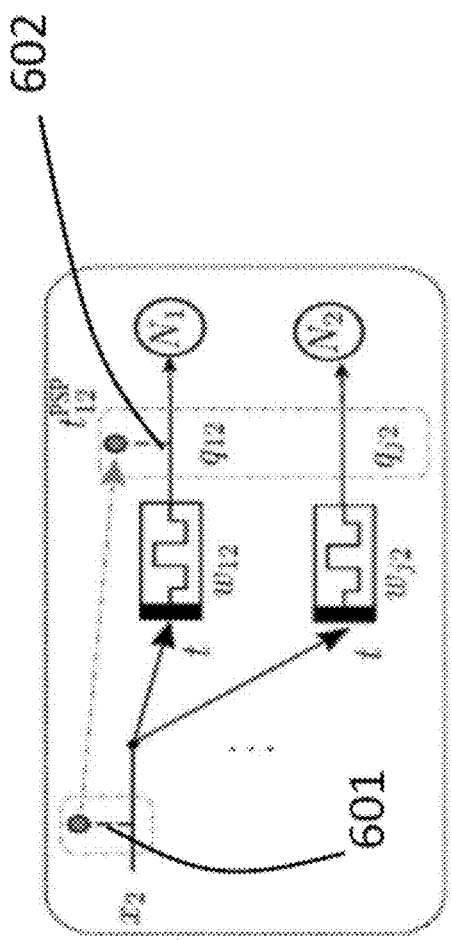
FIG. 6
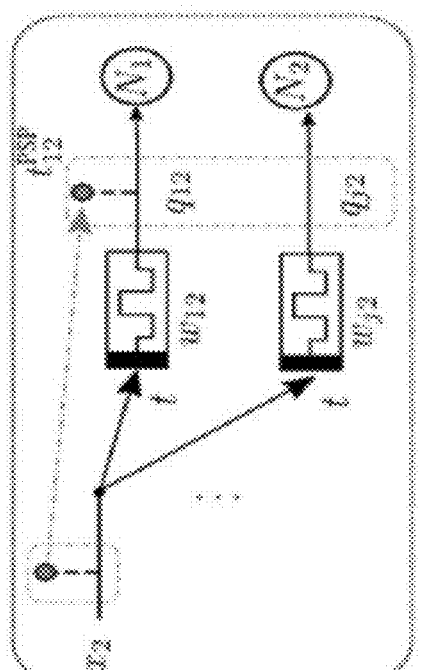
FIG. 7
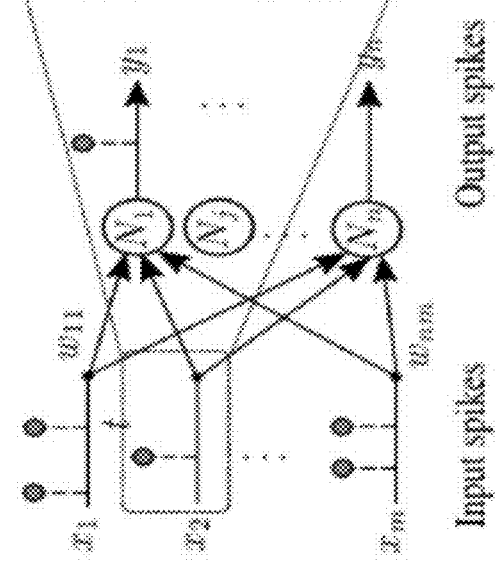

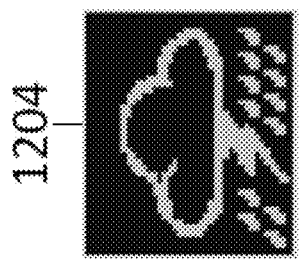
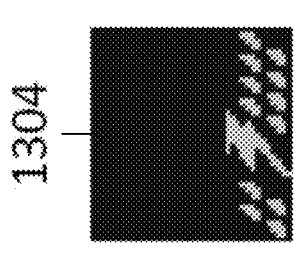
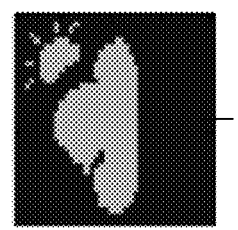
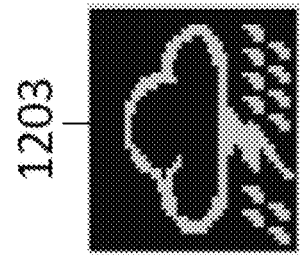
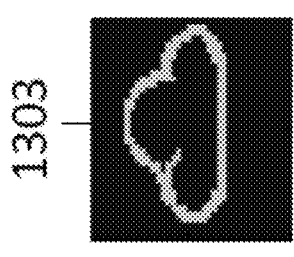
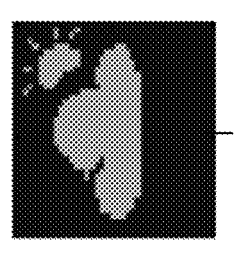
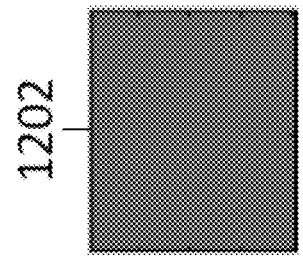
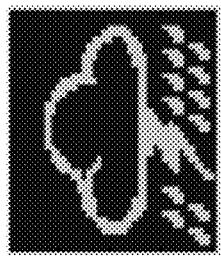
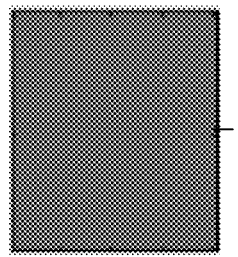
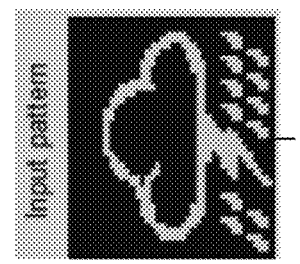
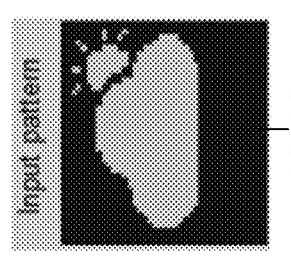
FIG. 12
FIG. 13

NEUROMORPHIC ARCHITECTURE FOR FEATURE LEARNING USING A SPIKING NEURAL NETWORK

BACKGROUND

The present disclosure relates to computing, and more specifically, to neuromorphic computing.

Conventional computing paradigm is based on CMOS logic and von Neumann architecture. With the advent of Big Data and an exponential growth of large streams of unstructured data, which becomes larger, faster and more diverse every day, the conventional computing paradigm (e.g. von Neumann machines) is inadequate to process and make sense of the volumes of information that people and organizations need to deal with. For example, Von Neumann machines are power/area-inefficient and too slow for a large class of parallel workloads. This is primarily owing to the fact that memory and CPU in these architectures are physically separated and therefore the throughput between the CPU and memory is limited.

Moreover, it is highly inefficient in terms of power consumption and space requirements. For example, typical modern high-performance computers have several thousand computing cores, consume about 100 kW of power and need about 20 tons of air-conditioned cooling capacity. Human brain, on the other hand, has billions of neurons and occupies less than 2 liters and consumes around 20 W of power. Simulating 5 seconds of brain activity would take around 500 s and need 1.4 MW of power if state-of-the-art supercomputers are used.

Neuromorphic computing aims to reduce the inefficiencies of the classical von Neumann architecture by unraveling not only the physical structure, but also the principles of the computation in the human brain. Neuromorphic computing focuses on novel bio-inspired energy-efficient, power density-efficient, and area-efficient hardware architectures capable of learning and of carrying out event-based computations. In particular, the capabilities of humans to quickly learn how to execute a task are in stark contrast to the classic software programming cycle that is iterative, prone to error, and expert-knowledge-dependent. Learning automation, or just even assistance, has a high potential for speeding up the programming cycle, or even completely replacing it with learning.

The learning mechanism determines the capabilities of the system. In the best performing artificial neural networks, the neurons specialize to detect particular characteristic parts of their input, called features. Developing architectures focused on extraction of features and building meaningful internal representations is the precursor to scalable networks capable of discovering important high-level regularities from the data.

Finally, neuromorphic systems are inherently predestined to operate via learning as they share similar structure with the neural networks of a brain. Combined with efficient hardware implementations, such as using memristive elements (i.e. e.g. memristors), neuromorphic systems will advance the boundaries of computation and enable fast efficient extraction of useful insights at scale and pace matching the needs of Big Data.

Current approaches to spiking neural networks focus mainly on template learning—storing exact memories of the patterns. This yields diminishing accuracy improvements with an increasing number of neurons that do not reach the accuracies of the deep artificial networks. Feature learning is an alternative approach in machine learning, in which extracting informative properties, called features, of the input is preferred to memorizing all possible input patterns. These features are then utilized by multi-layered neural architectures to improve the accuracies on difficult tasks. There are a few examples of feature-based spiking networks, but the features are learned using artificial neural networks and converted into the weights of spiking neurons.

SUMMARY

According to embodiments of the present disclosure, a neuromorphic computing system having a plurality of spiking neurons, each with a plurality of synapses and corresponding synaptic weights is disclosed. The system further includes a synaptic competition mechanism in connection with a spike-based learning mechanism based on spikes perceived behind a synapse, where synapses of different neurons connected to the same input compete for that input and, based on the result of that competition, each neuron of the neural network develops an individual perception of the presented input spikes, the perception used by the learning mechanism to adjust the synaptic weights.

Further disclosed herein are embodiments of a method for feature learning in a neuromorphic computing system having a plurality of spiking neurons, each with a plurality of synapses and corresponding synaptic weights. The method includes starting from an empty network in which all neurons are disabled, enabling a neuron and designating the neuron as a current overflow neuron; initializing the synaptic weights of the current overflow neuron to a non-zero value; initializing the neuronal threshold of the current overflow neuron to the size of the smallest feature to be captured; and when the current overflow neuron spikes, designating the overflow neuron as a regular neuron in the neural network, and designating a next neuron as the current overflow neuron.

Further disclosed herein are embodiments of a learning mechanism for a spiking neural network having a plurality of spiking neurons, each with a plurality of synapses and corresponding synaptic weights. The learning mechanism is a spike-based learning mechanism based on spikes perceived behind a synapse.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1A shows a diagram of an example of a plurality of synaptic inputs x1, . . . , xm with spikes 101, 102, 103, 104 in a time window between times TL and TR.

FIG. 1B shows in a diagrammatic illustration a first example of the operation of the potentiation function and of the depression function.

FIG. 2 shows a diagram of an example of a neuron Nj with synaptic outputs qj1, . . . , qji, . . . , qjm according to an embodiment of the present disclosure.

FIG. 3 shows a diagram of an example of inputs with spikes grouped into groups according to the input sampling time windows ΔT.

FIG. 4A shows a diagram of a further example of inputs with spikes grouped into groups according to the input sampling time windows ΔT.

FIG. 4B shows a diagrammatic illustration of a second example of the operation of the potentiation function and of the depression function.

FIG. 6 shows a diagram of an example of the processing of an input x2 by the synapses of two neurons N1 and N2.

FIG. 7 shows a diagram of an example of the processing of inputs x1, . . . , xm by the synapses of neurons N1, . . . , Nm.

FIG. 12 shows a diagrammatic illustration of an example of a step of feature learning according to an embodiment of the present disclosure.

FIG. 13 shows a diagrammatic illustration of an example of a further step of feature learning according to an embodiment of the present disclosure.

Figure 5A:
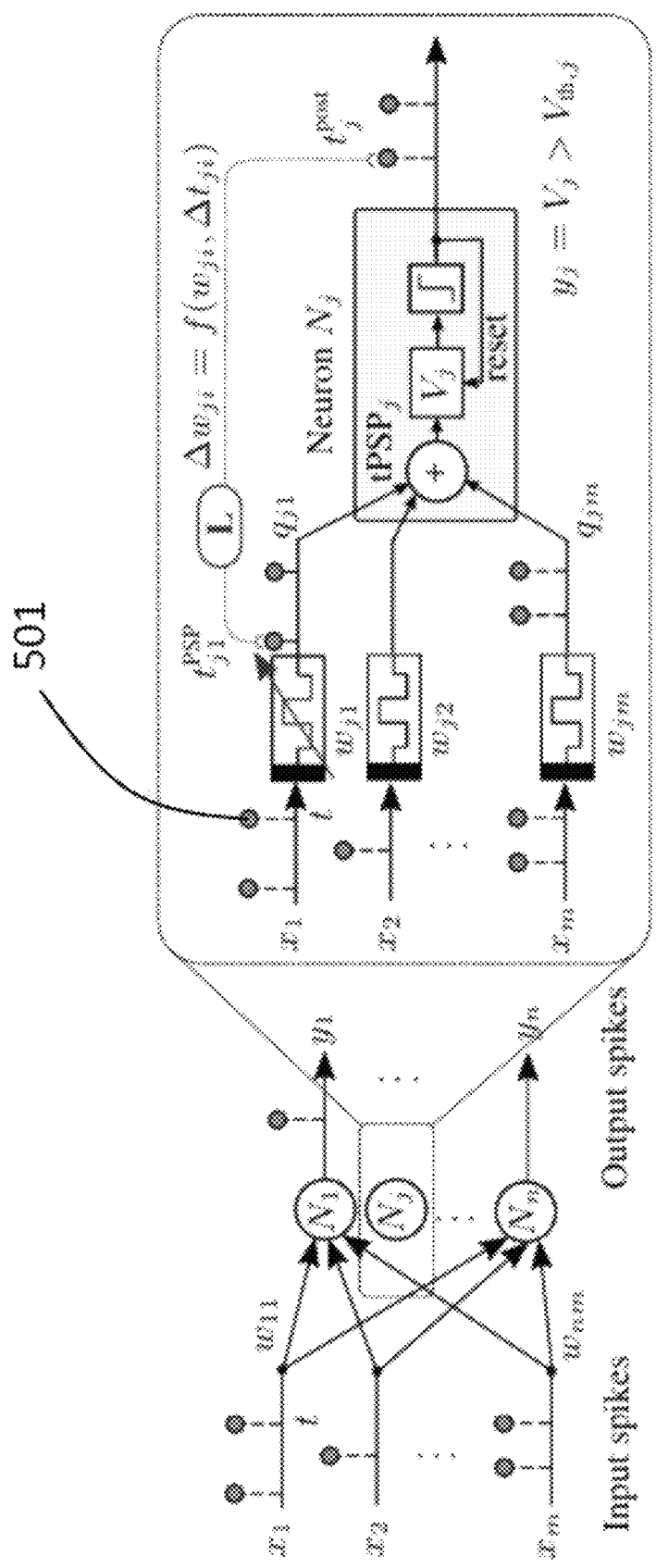
FIG. 5A shows a diagram of an example of a neuromorphic architecture according to an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Embodiments of the invention will now be described more fully with reference to the accompanying drawings. The invention may, however, be embodied in many different forms and should not be construed as limited to the embodiments set forth herein. The invention should only be considered limited by the claims as they now exist and the equivalents thereof.

In the context of the description and the claiming of the present invention special terms are used with the following meaning:

A spiking neural network (SNN) is a special type of a neural network model that, in addition to the concept of a network of neurons interconnected by synapses, also incorporates the concept of time into their operating model. The idea is that neurons in the SNN do not emit floating-point values at each propagation cycle (as it happens with typical multi-layer perceptron networks), but rather emit all-or-none spikes only when a membrane potential—an intrinsic quality of the neuron related to its membrane electrical charge—reaches a specific value. Activation of a neuron is called "firing". When a neuron fires, it generates a signal which travels to other neurons which, in turn, increase or decrease their potentials in accordance with this signal.

The concept of feature extraction plays an important role in several branches of artificial intelligence, as e.g. in artificial neural networks, machine learning, pattern recognition and in image processing. Feature extraction starts from an initial set of measured data and builds derived values (features) preferably intended to be informative and non-redundant, preferably facilitating the subsequent learning and generalization steps. Feature extraction is frequently related to dimensionality reduction or redundancy reduction. Especially when the input data to an algorithm is too large to be processed and it is suspected to be redundant (e.g. the same measurement in both feet and meters, or the repetitiveness of images presented as pixels), then it can be transformed into a reduced set of features (also named a feature vector). The extracted features are expected to contain the relevant information from the input data, so that the desired task can be performed by using this reduced representation instead of the complete initial data.

A neuromorphic architecture (for a spiking neural network) is an architecture for an information processing device or simulation algorithm for such a device, which is based on a large collection of simple neural units (spiking neurons), to a certain extent analogous to the observed behavior of a biological brain's neurons. Each neural unit is connected with many others through so called synapses, and synaptic links can enhance or inhibit the activation state of adjoining neural units. Each individual neural unit computes some kind of function of inputs and the state of the neuronal membrane. There may be a threshold function or limiting function on each connection and on the unit itself, such that the signal must surpass the limit before propagating to other neurons.

The term spiking neurons refers to a kind of neurons that produce a neuronal output in form a so called spike train, preferably a temporal pattern of preferably binary spikes. Various coding methods exist for interpreting the outgoing spike train as a real-value number, either relying on the frequency of spikes, or the timing between spikes, to encode information.

Synapses of spiking neurons perform a pre-processing of synaptic input signals defined by the so called synaptic weights of the neuron.

Embodiments of the present invention may provide simple and efficient architectures and methods for feature extraction directly in spiking neural networks. In contrast to prior art feature learning architectures, which utilize a level-tuning-based arbitration scheme for groups of neurons and various modified learning mechanisms to extract the features, embodiments of the present invention achieve similar results using a simpler and more scalable solution for feature learning.

According to preferred embodiments of the present invention, a learning mechanism for such a neuromorphic architecture and a neuromorphic architecture with such a learning mechanism preferably utilizes perception of the inputs relative to a given neuron to adjust the synaptic weights by a procedure, in which the synapses corresponding to the input spikes perceived by a given neuron are depressed if a neuron does not spike, whereas, if a neuron spikes, synapses corresponding to the perceived input spikes are potentiated.

According to these or other preferred embodiments of the present disclosure, a learning mechanism for a spiking neural network and a neuromorphic architecture with such a learning mechanism preferably utilizes perception to adjust the synaptic weights according to $$\Delta w_{ji} = \begin{cases} f_+(w_{ji}, \Delta t_{ji}) & \text{if } \Delta t_{ji} = 0 \\ f_-(w_{ji}, \Delta t_{ji}) & \text{if } \Delta t_{ji} \neq 0 \end{cases}$$

on occurrence of a neuronal spike and $$\Delta w_{ji} = \begin{cases} f_-(w_{ji}, \Delta t_{ji}) & \text{if } \Delta t_{ji} = 0 \\ 0 & \text{otherwise} \end{cases}$$

on lack of a neuronal spike, where
$\Delta w_{ji}$=an increment of weight $w_{ji}$
$\Delta t_{ji} = t_j^{post} - t_{ji}^{PSP}$,
where $t_j^{post}$ is the timing of the last output firing of neuron $N_j$,
$t_{ji}^{PSP}$ is the timing of the last synaptic output $q_{ji}$ of synaptic weight $w_{ji}$,
$f_+(w_{ji}, \Delta t_{ji})$=a potentiation function
and
$f_-(w_{ji}, \Delta t_{ji})$=a depression function
that comprises a corresponding adjustment of the synaptic weights.

Bio-inspired by the concept of STDP (Spike-Timing-Dependent Plasticity), a potentiation or a depression function, $f_+(w_{ji}, \Delta t_{ji})$ or $f_-(w_{ji}, \Delta t_{ji})$ respectively, determines synaptic weight adjustments $\Delta w_{ji}$, positive or negative respectively, based on the relative timing of neuronal spikes and inputs spikes $\Delta t_{ji} = t_j^{post} - t_{ji}^{PSP}$, and the current weight value $w_{ji}$.

The shapes of these functions in biological synapses are typically approximated using exponentially decaying functions. In state-of-the-art SNN implementations, many other shapes were proposed. In preferred embodiments of the invention, the shapes presented in FIG. 1B and FIG. 4B were used for illustration, but the functioning of embodiments of the invention is not limited to those shapes only.

Various implementations of weight adjustments using potentiation and depression are possible. In biological neurons, they are implemented by the biological plasticity mechanisms of the synapses. In software for computer systems, the adjustments are typically calculated based on given formulas and added to the weights.

In a hardware realization of the disclosed embodiments of a neuromorphic system, such as with one using memristive or phase change memory (PCM) devices as synapses, potentiation and depression involves sending pulses to the synapses (e.g. via a pulse generator), with pulse parameters dependent on the relative timing $\Delta t\_ji$. Embodiments of a learning mechanism may be implemented using one or more hardware circuits configured to perform the actions described herein.

According to these or other preferred embodiments of the present invention, a learning mechanism for an artificial spiking neural network and a neuromorphic architecture with such a learning mechanism utilizes or comprises an adjustable neuronal threshold $V_j^{th}$ or $V_{th,j}$, which is adjusted according to
$V_j^{th} = p \cdot TPSP_j$ on occurrence of a neuronal spike and
$V_j^{th} = V_j^{th} - p \cdot TPSP_j$ on lack of a neuronal spike,
where p is a real number with $0 \leq p \leq 1$,
$V_j^{th}$ or $V_{th,j}$=said adjustable neuronal threshold
and
$TPSP_j = \Sigma q_{ji}$ is a total post-synaptic potential at a neuron j with $q_{ji}$=synaptic output of a synaptic weight with $w_{ji}$.

Values of p<1 enable to detect patterns for noisy inputs, in which not all pattern pixels appeared correctly. However, if the value is too low, neurons might fire for different patterns that they were intended to fire. Therefore, the value of p depends on the type and circumstances of the application and a spectrum of values may be used based on the amount of noise in the inputs and the similarity of the patterns that need to be distinguished.

According to these or other preferred embodiments of the present invention, a learning mechanism for a spiking neural network and a neuromorphic architecture with such a learning mechanism utilizes or comprises at least the following steps:
start from an empty network, in which all neurons are disabled;
enable a neuron, preferably chosen at random, and designate this neuron as an overflow neuron, i.e. the current overflow neuron;
initialize the synaptic weights of the current overflow neuron to a non-zero value;
initialize the neuronal threshold of this current overflow neuron to the size, preferably the amplitude, of the smallest feature to be captured;
when the current overflow neuron spikes, this neuron becomes a regular neuron in the neural network, and a next neuron, preferably randomly chosen, among the currently unused neurons is now designated as the current overflow neuron.

According to these or other embodiments of the present disclosure, the synapses of different neurons connected to the same input compete for that input. Based on the result of that competition, each neuron develops an individual perception of the presented input spikes.

The proposed architecture and the learning mechanism may be employed for extracting features—useful characteristic properties of the inputs. In comparison to state-of-the-art in spiking neural networks, the present invention provides means of learning the features using generic neurons, operating without additional complex feedback mechanisms, and can be easily realized in highly integrated neuromorphic hardware.

Spiking Neural Networks (SNN) utilize spikes for communication. Analog information can be encoded in various ways, e.g. by a rate of spikes, by co-activation of multiple neurons (population code), or by a time to spike code (spike-timing-dependent code). As shown in FIG. 1A, analog inputs x1, . . . , xm are represented by spikes 101, . . . , 104 in a time window between TL and TR. Intensities of the inputs are depicted in FIG. 1A as different grey values of the squares on the left side of FIG. 1A. The time to spike is a function of the intensity of the corresponding analog input.

As shown in FIG. 5A, the input spikes encoding the synaptic inputs $x_1, \ldots, x_m$ are processed by synaptic weights $w_{11}, \ldots, w_{ji}, \ldots, w_{nm}$ before being further processed by neurons $N_1, \ldots, N_j, \ldots, N_m$ to produce the neural outputs spikes $y_1, \ldots, y_n$. The right hand side of FIG. 5A shows enlarged and more detailed version of a preferred embodiment of the processing of the input spikes by synaptic weights and neuron $N_j$. The input spikes are processed by the weights to produce synaptic outputs $q_{ji}$. Input spike 501 is processed by synaptic weight $w_{j1}$ to produce synaptic output $q_{j1}$. The perceived spike with timing $t_{j1}^{PSP}$ contributes then to the total post-synaptic potential given by $TPSP_j = \Sigma q_{ji}$. As also shown in FIG. 5A, a learning mechanism L is utilized, according to which the synaptic weights $w_{ji}$ are preferably incremented in a learning step by $$\Delta w_{ji} = \begin{cases} f_+(w_{ji}, \Delta t_{ji}) & \text{if } \Delta t_{ji} = 0 \\ f_-(w_{ji}, \Delta t_{ji}) & \text{if } \Delta t_{ji} \neq 0 \end{cases}$$

on occurrence of a neuronal spike and by $$\Delta w_{ji} = \begin{cases} f_-(w_{ji}, \Delta t_{ji}) & \text{if } \Delta t_{ji} = 0 \\ 0 & \text{otherwise} \end{cases}$$

On lack of a neuronal spike, where $\Delta w_{ji}$=an increment of weight $w_{ji}$
$\Delta t_{ji} = t_j^{post} - t_{ji}^{PSP}$
$f_+(w_{ji}, \Delta t_{ji})$=a potentiation function
and
$f_-(w_{ji}, \Delta t_{ji})$=a depression function.
The neuronal output with timing $t_j^{post}$ encodes the output $y_j$ of neuron $N_j$.

As shown in FIG. 2, neurons may use a summation operator 202 and a threshold operator 201 to produce neuronal output spike yi. The threshold may be adjusted to reflect the pattern stored in the synaptic weights of a particular neuron. As a result, the neuron will spike for that pattern, or for a pattern with overlap determined by p. A typical value for p=70%, while values $0 \leq p \leq 1$ may be appropriate and preferable in various applications.

For an activation of neurons a method we shall call "overflow neuron" concept may preferably be used. According to this method the following steps are preferably done:
  start from an empty network (all neurons disabled)
  enable a neuron and designate it as an overflow neuron:
  initialize its synaptic weights to a non-zero value,
  initialize its neuronal threshold to the size of the smallest feature to be captured;
  when an overflow neuron spikes, it becomes a regular neuron in the neural network and next unused neuron is designated as the overflow neuron.
These steps may preferably be iterated, preferably until no further change occurs.

A possible interpretation of this "overflow neuron" concept may be the following: Each time a pattern appears, the synapses of the overflow neuron compete with existing active neurons for the input. If novel input is large enough, the overflow neuron captures it. The network dynamically adjusts its size, avoiding capturing redundant or empty features.

FIG. 6 illustrates the concept of synaptic competition in the context of several embodiments of the present invention. Whereas the synapse with weight $w_{12}$ of neuron $N_1$ in FIG. 6 produces a perceived spike $t_{12}^{PSP}$ or 602 in response to spike 601, there is no $t_{j2}^{PSP}$ defined for neuron $N_2$ for this spike 601, and the synaptic output $q_{j2}=0$ as a result of synaptic competition. As a general rule, high values of synaptic outputs lead to a perceived spike while low values of synaptic outputs do not lead to perceived spikes.

Embodiments of the invention therefore provide a scalable neuromorphic architecture for feature learning by a neuromorphic processing device comprising
1) Multiple neurons that are activated using a "neuron overflow" concept and having adjustable thresholds;
2) Multiple synapses per neuron that receive inputs $x_i$ and a synaptic competition mechanism that determines a perceived spike $t_{ji}^{PSP}$;
3) A learning mechanism L that operates based on the result of synaptic competition.

The so far described embodiments of the present invention may be compared to prior art teachings in order to see advantages of the present invention.

In a traditional version of neuromorphic computing the output of a synapse depends only on the input and the synaptic weight, as given by $$q_{ji} = x_i w_{ji}$$

With synaptic competition the synaptic outputs $q_{ji}$ depend also on other factors. In the preferred embodiments this involves:

$$q_{ji} = x_i w_{ji} \cdot \frac{1}{\sum_j w_{ji}} \quad \text{a)}$$

or $$q_{ji} = x_i w_{ji} \cdot c_{ji} \quad \text{b)}$$

respectively, where $$c_{ji} = \begin{cases} 1 & \text{if } w_{ji} = \max_k \{w_{ki}\} \\ 0 & \text{otherwise} \end{cases}$$

or $$c_{ji} = \begin{cases} 1 & \text{if } w_{ji} y_j = \max_k w_{ki} y_k \\ 0 & \text{otherwise} \end{cases}$$

Version a is also called "distribution of energy". In this approach each active input spike $x_i$ contributes a fixed unit amount of "energy" that is distributed to all the synapses of different neurons and yields synaptic outputs $q_{ji}$ proportional to their synaptic weights $w_{ji}$. If $q_{ji} > q_{th}$, then input is perceived as a spike by neuron j with $t_{ji}^{PSP}$. If $q_{th}=0.5$, only one single synapse can win, which leads to a "Winner-Take-All" (WTA-)like behavior. Version b is also called "synaptic WTA". It corresponds to a Winner-Take-All circuit, which is applied to the competing synapses and a winner is chosen explicitly as having $c_{ji}=1$. An input spike $t_{ji}^{PSP}$ is perceived if $q_{ji}>0$.

Figure 5B:
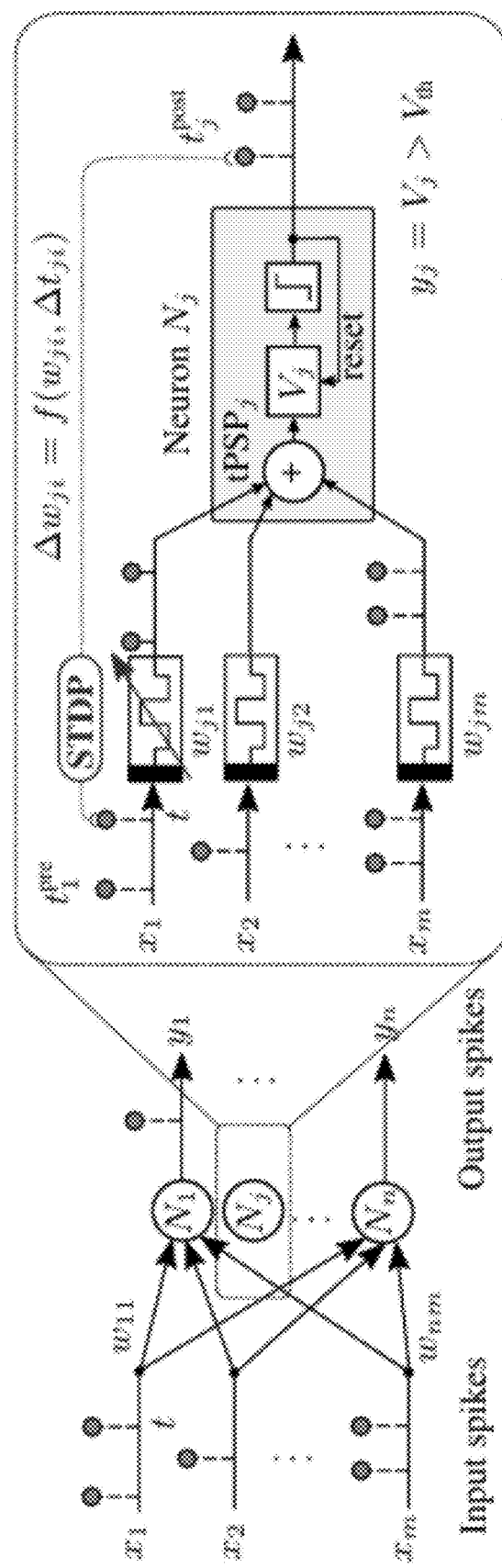
FIG. 5B shows a diagram of an example of a prior art neuromorphic architecture.
Figure 9:
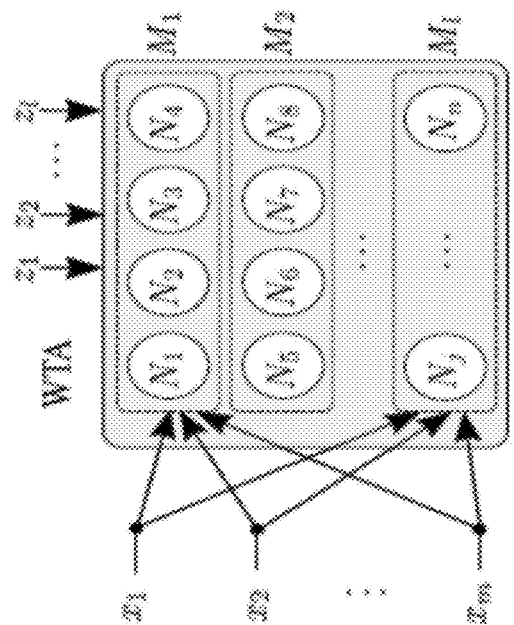
FIG. 9 shows a diagrammatic illustration of a further example of a prior art learning mechanism.
Figure 8:
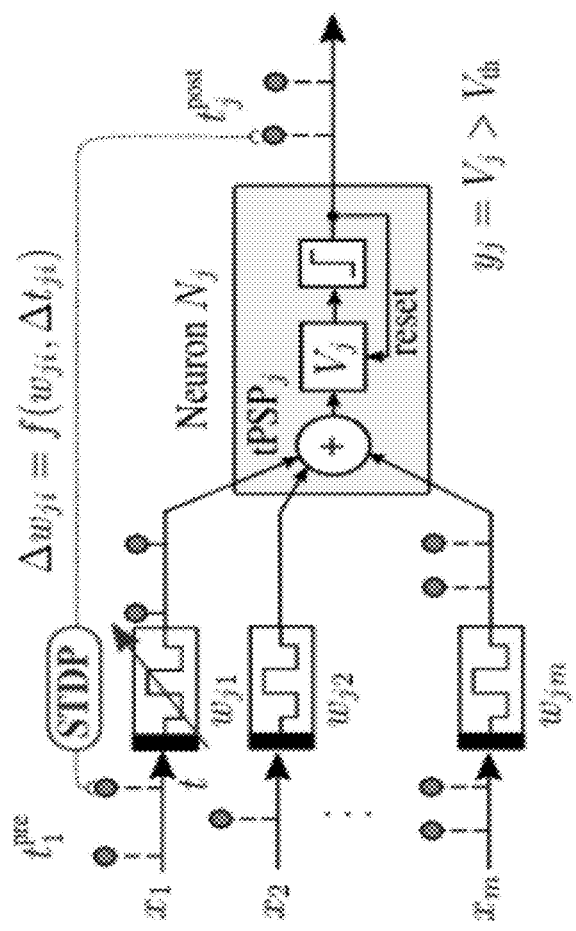
FIG. 8 shows a diagrammatic illustration of an example of a prior art learning mechanism.

A traditional neuromorphic architecture is depicted in FIGS. 5B and 8 with a learning mechanism STDP with $\Delta t_{ji} = t_j^{post} - t_i^{pre}$. The limitation of this traditional architecture is that it learns entire patterns 1101 rather than extracting features 1105 (with respect to FIG. 11). Another traditional architecture, a WTA mechanism for groups of neurons with different learning rules (variations of STDP) is depicted in FIG. 9. The limitations of this architecture may be seen in redundant or empty features and a complex implementation because of different neuron types with inter-neuron signaling.

The following case study shall illustrate the application of embodiments of the present invention to feature learning with cross-neuronal synaptic feedback implemented through synaptic competition. As shown in FIG. 12, the start point is an empty network, in which the weights 1202 of all neurons are equal. An overflow neuron is then added with weights w=0.1 and a neuronal threshold assumed to be 0.5% of the input size, i.e. Vth=8. A pattern with 40 times 40 pixels of a cloud with rain and thunder appears as input pattern 1201. Pattern 1203 shows the perceived inputs. The neuron spikes (1205) and the final weights are depicted in pattern 1204. The threshold is increased, Vth=p*TPSP1 and the overflow neuron captures the novelty and becomes a regular neuron.

In a second learning step (not depicted in the figures), the same input pattern 1201 appears again. Neuron N1 now spikes as expected, as it detects the pattern it learned in the foregoing step. There is no activity in the next (second) overflow neuron (say: N2), because neuron N1 wins all the input. There is no novelty, so the overflow neuron (of step 2) N2 remains the overflow neuron (in step 3). No weight changes occur for the current overflow neuron.

In a third step depicted in FIG. 13, a so far unseen pattern 1301 appears as input pattern. The synapses 1306 of the overflow neuron N2 win the novel parts 1307 of the input pattern 1301. Pattern 1303 depicts the perceived inputs of neuron N1, which does not spike, because the sum of the synaptic outputs TPSP1 of N1 remains below the threshold Vth. The current overflow neuron N2 now spikes and its final weights are depicted by pattern 1308, whereas the final weights of N1 are depicted in pattern 1304. Because there is no spike of neuron N1, the perceived inputs are depressed and Vth is adjusted.

Figure 14:
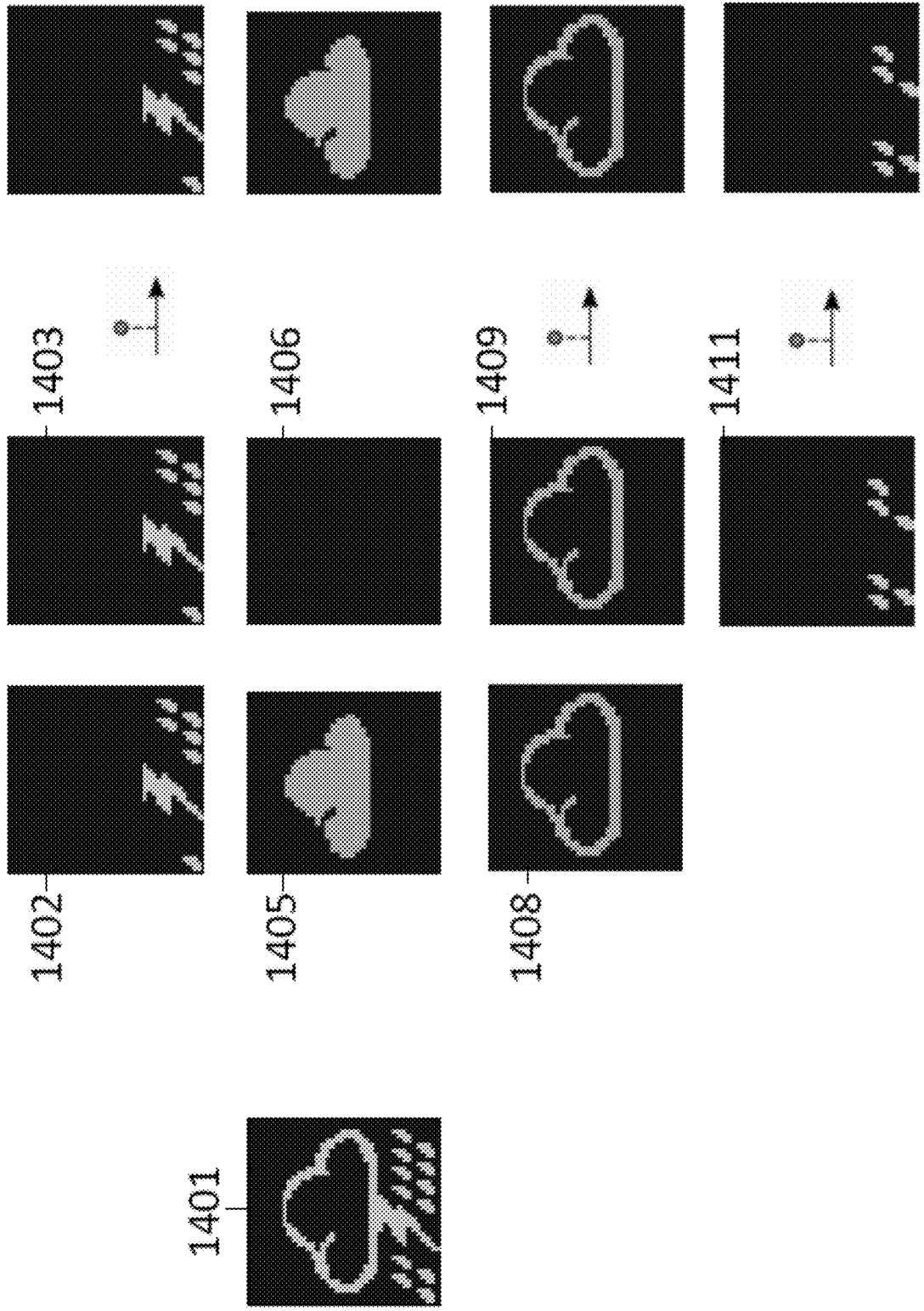
FIG. 14 shows a diagrammatic illustration of an example of a further step of feature learning according to an embodiment of the present disclosure.

In a fourth step, not depicted in the figures, a so far unseen pattern appears as input pattern. The synapses of the next overflow neuron (say N3) win the novel parts of the input pattern. Only N3 spikes. In a fifth step, depicted in FIG. 14, an input pattern 1401 identical to the first two input patterns appears again at the input. Patterns 1402, 1405 and 1408 depict the prior weights of neurons N1, N2 and N3. A next overflow neuron N4 is introduced. Patterns 1403, 1406, 1409 and 1411 show the perceived inputs of N1, N2, N3 and N4. Neurons N1, N3 and N4 spike, whereas neuron N2 does not produce a spike, i.e. there is no activity of N2 because it has no perceived inputs.

Figure 15:
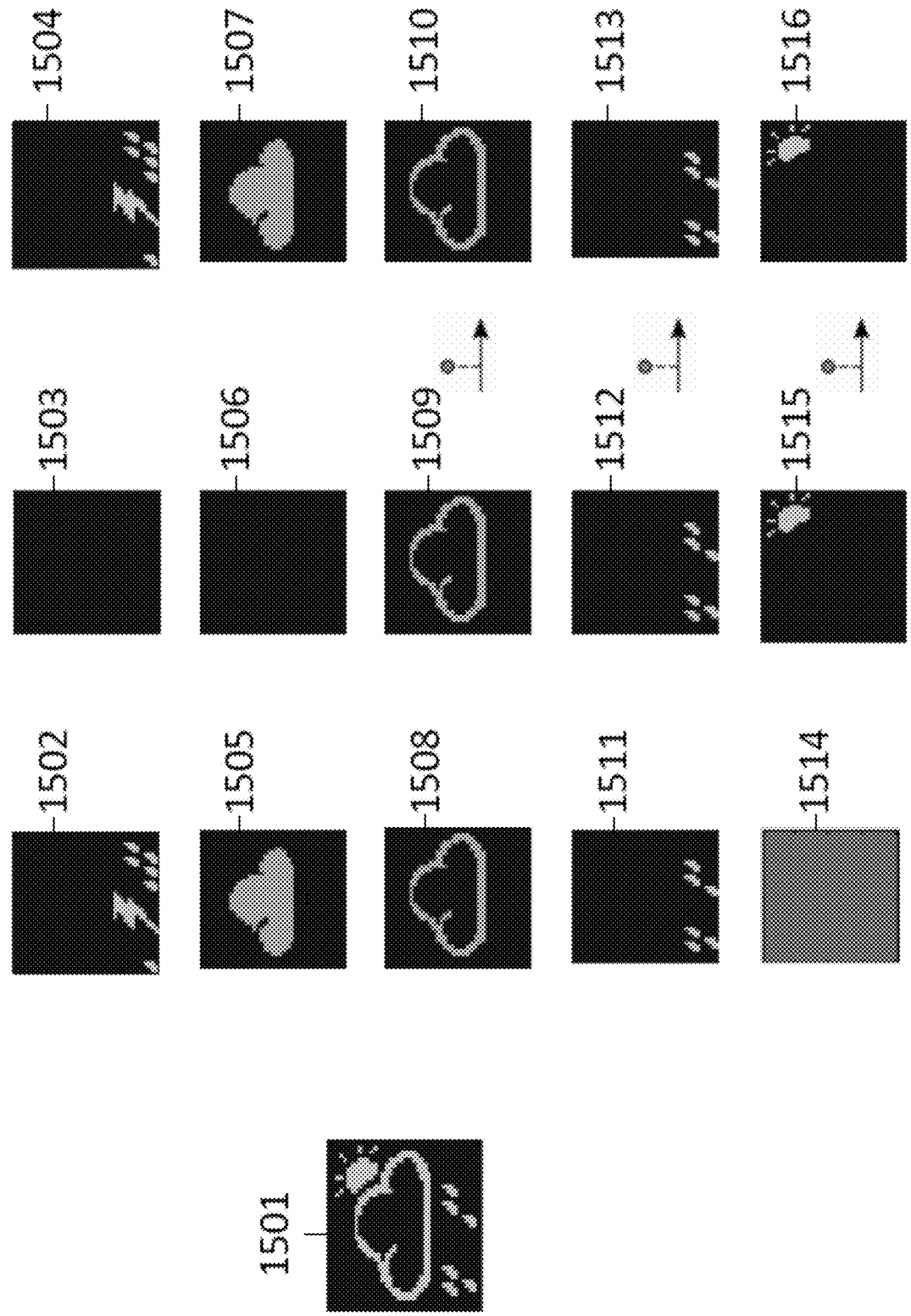
FIG. 15 shows a diagrammatic illustration of an example of a further step of feature learning according to an embodiment of the present disclosure.

In a final step, depicted in FIG. 15, the fourth input pattern appears again as an input pattern 1501. Patterns 1502, 1505, 1508, 1511 and 1514 correspond to the prior weights of neurons N1, N2, N3, N4 and N5, the current overflow neuron. Patterns 1503, 1506, 1509, 1512 and 1515 show the perceived inputs of these five neurons. Only neurons N3, N4 and N5 spike. Patterns 1504, 1507, 1510, 1513 and 1516 show the final weights of these neurons.

Figure 16:
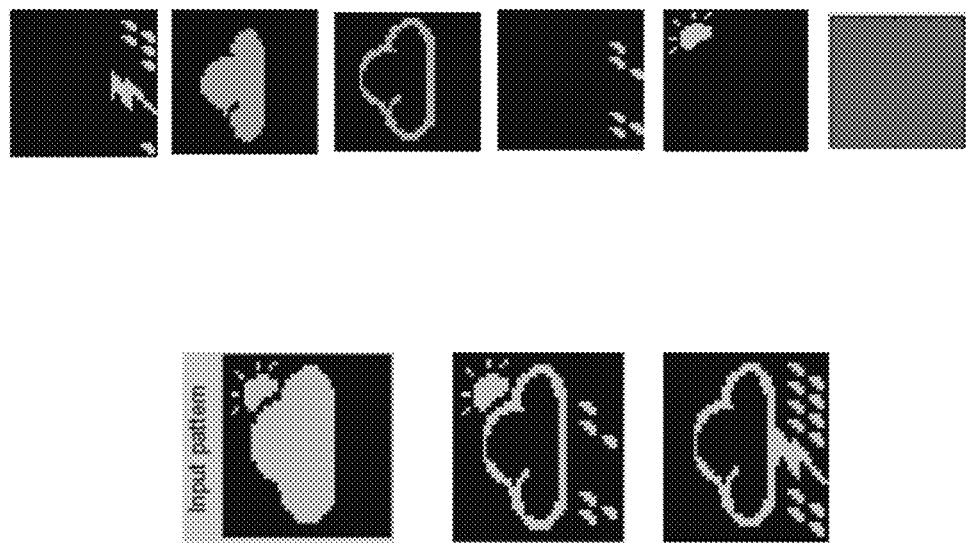
FIG. 16 shows a diagrammatic illustration of an example of a result of feature learning according to an embodiment of the present disclosure.

FIG. 16 shows the results after the final step, when learning has finished, because the components (i.e. the features) learned by the neurons suffice to explain all the different patterns (presented so far). In consequence, no further overflow neurons will be activated. Firing of particular neurons for a particular pattern indicates the components that constitute that pattern.

Advantageously, the neuromorphic architecture and the learning mechanism according to the present invention is robust to noise, since no neurons are activated if the noise magnitude remains below the minimal feature size, i.e. when the threshold of the overflow neuron is not crossed. The system is also robust to jitter to a certain extent, i.e. jitter within the integration time step ΔT as shown in 303 in FIG. 3 does not affect the performance of the system. This time step ΔT is a parameter of the system and may be adjusted for a particular application. Jitter 304 crossing the integration step is considered as noise.

In case of excessive jitter between integration time steps 401, 402, symmetric STDP may be used together with potentiation function and a depression function $$\Delta w_{ji} = \begin{cases} f_+(w_{ji}, \Delta t_{ji}) & \text{if } \Delta t_{ji} \in [T_L, T_R] \\ f_-(w_{ji}, \Delta t_{ji}) & \text{if } \Delta t_{ji} \notin [T_L, T_R] \end{cases}$$

as depicted in FIG. 4B. The pattern represented by spikes crossing the integration time step in 403 (FIG. 4A) is then captured in spite of the jitter. Different patterns cannot overlap in the f+ window [TL,TR].

In case of analog inputs, the analog information can be encoded in various ways, e.g. by a rate of spikes, by co-activation of multiple neurons (population code), or by a time to spike code (spike-timing-dependent code). FIG. 1A depicts the case of time to spike encoding. A similar learning rule as given above may be used, where the magnitudes of the weight increase f+ preferably depends on Δt as e.g. depicted in FIG. 1B and preferably reflects the contribution of the analog value.

Embodiments of the present invention may be applied in neuromorphic architectures where the synapses are implemented using resistive memory cells such as e.g. phase-change memory cells. The learning rules described for potentiation and depression may be implemented using the crystallization and amorphization characteristics of these devices.

Embodiments of the present invention may be applied in a multilayer architecture, which provides a way of representing an input as a composition of simple components with increasing level of abstraction at each layer:
features learned in layer 1 can be utilized by layer 2 to form a compact representation of the inputs
with 3 neurons becoming active for 3 patterns of 20 times 20 inputs, 400 bit input may be compressed into 3 bits.

Figure 10:
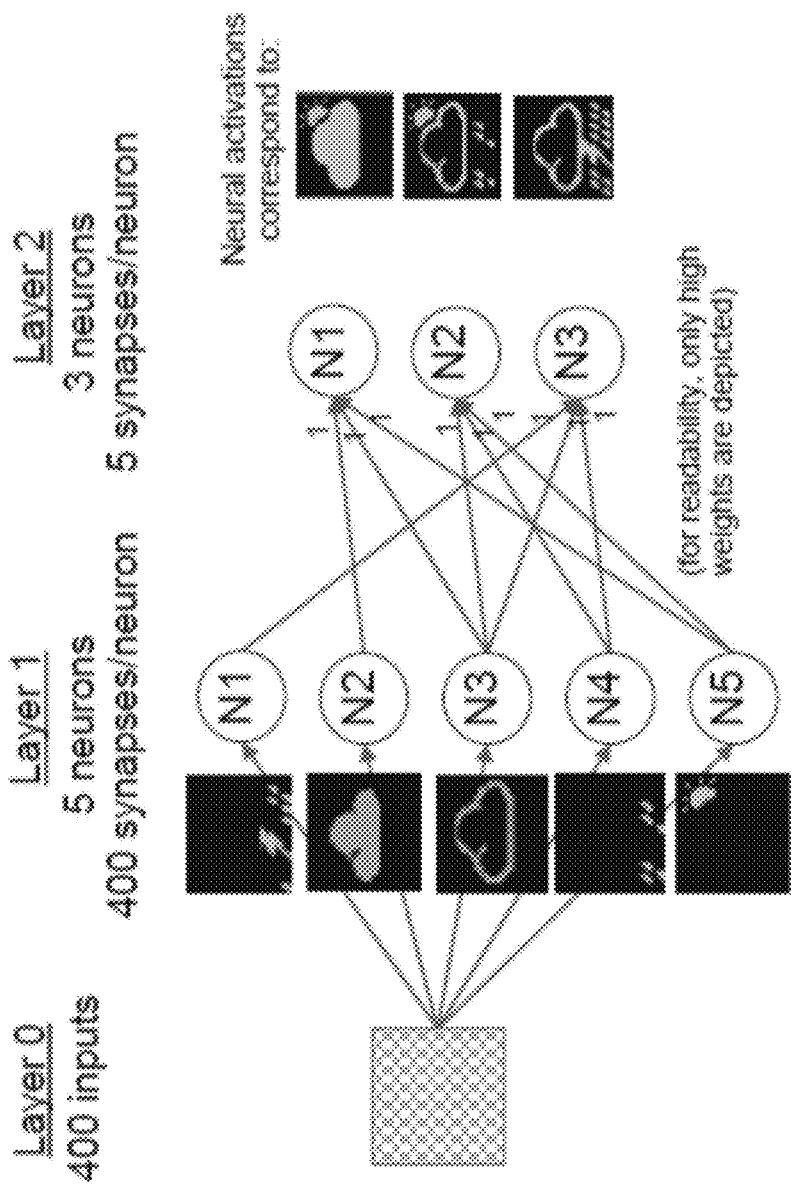
FIG. 10 shows a diagram of an example of the processing of inputs by a multi-layer neural network according to an embodiment of the present disclosure.

For 5 basic features, the example system depicted in FIG. 10 can represent 25=32 input patterns. Remembering entire 32 patterns of size 400 requires 12800 synapses if one layer is used. Using 5 features requires 2000 synapses in the first layer and 5*32=160 synapses in the second layer (83% reduction vs. 1-layer approach).

Figure 11:
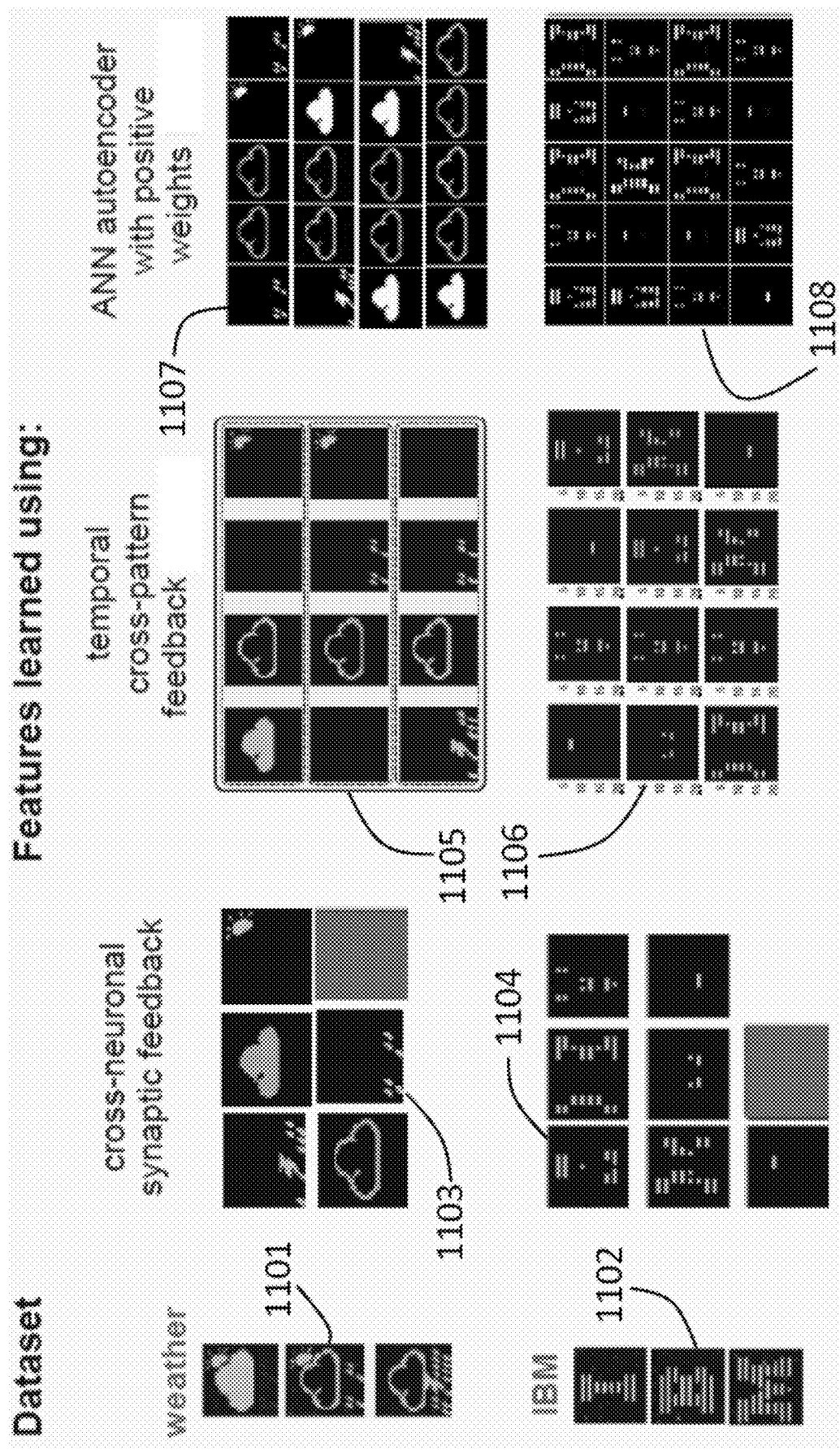
FIG. 11 shows a diagrammatic illustration of an example of feature learning according to an embodiment of the present disclosure.

Finally, FIG. 11 gives a comparison with other feature learning mechanisms. For the data sets 1101 and 1102 respectively, patterns 1103, 1104, 1105, 1106, 1107 and 1108 show the features learned using cross-neuronal synaptic feedback, temporal cross-pattern feedback and ANN auto encoder with positive weights.

Figure 17:
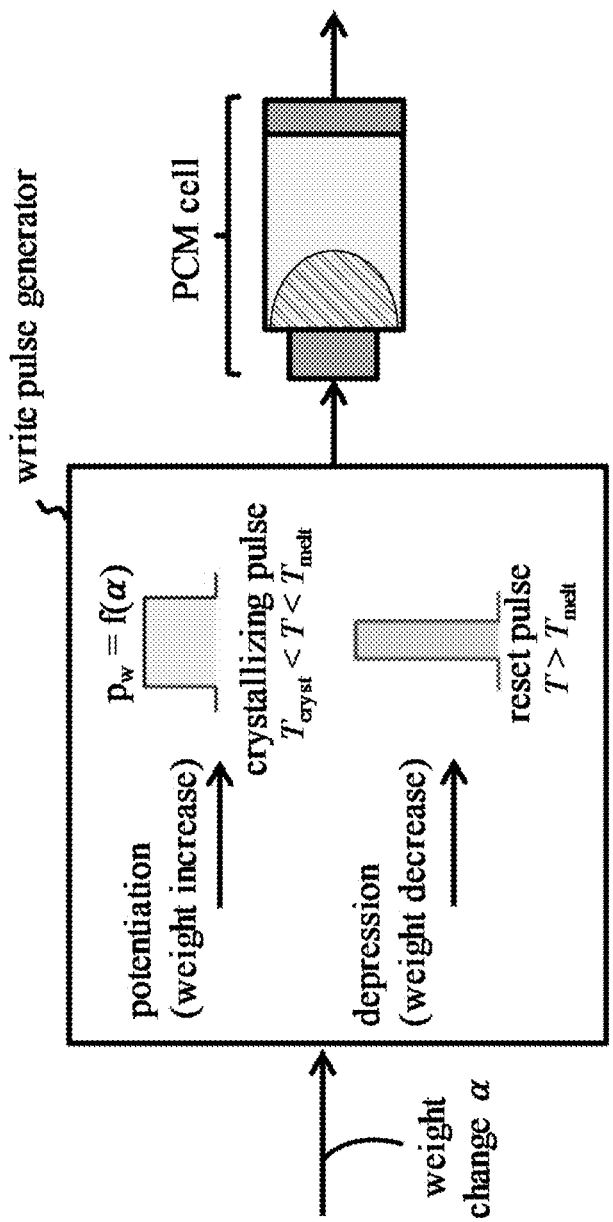
FIG. 17 shows a pulse generation scheme for 1-PCM synapse according to an embodiment of the present disclosure.

Embodiments of an implementation based on PCM (Phase Change Memory) elements may involve one (1-PCM), two (2-PCM), or more PCM devices representing a synaptic weight $w_{ji}$. A single PCM nanodevice, also referred to as a PCM cell, comprises a phase-change material situated between two electrodes. The phase-change material can be in the amorphous state, which has low electrical conductance G, or in the crystalline state, which has high electrical conductance G. In 1-PCM synapse, the synaptic weight $w_{ji}$ is stored in the phase configuration of a device with corresponding conductance $G_{ji}$. A potential pulse generation scheme for 1-PCM synapse is illustrated in FIG. 17. During the learning, crystallizing pulses are generated to increase the synaptic conductance of a PCM cell, or reset pulses are generated to decrease the synaptic conductance.

Figure 18:
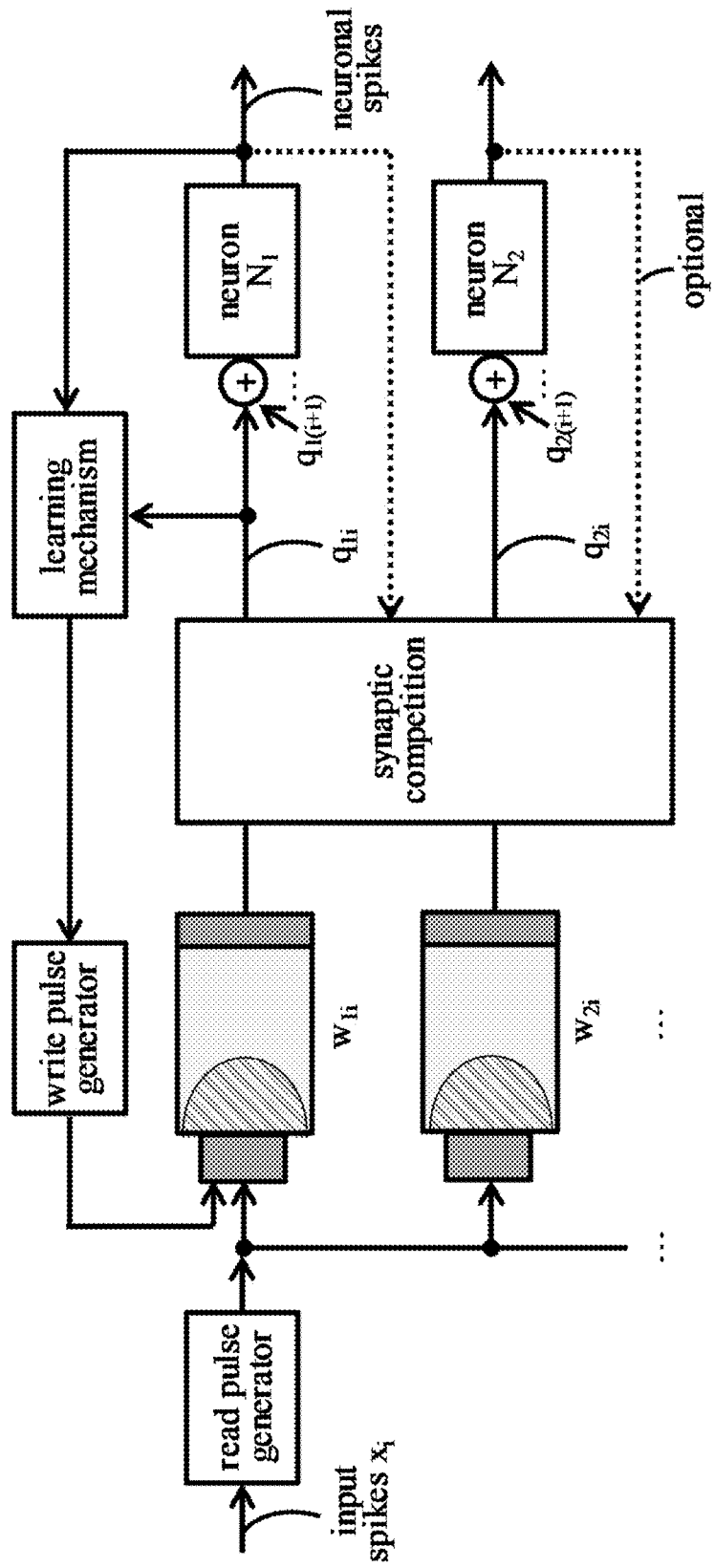
FIG. 18 shows a diagram of an implementation of a learning scheme using 1-PCM synapses according to an embodiment of the present disclosure.

In FIG. 18, a diagram of a potential implementation of the learning scheme using 1-PCM synapses is illustrated for a subset of a network comprising two neurons and their respective synapses connected to an input xi. Activity at the input xi triggers a read pulse generator, which applies read pulses to the 1-PCM synapses. The obtained signals are processed by the synaptic competition mechanism, and become synaptic outputs qji. In an embodiment of the competition, in which cji depends on the neuronal spikes yj, there is also a link between the neuronal outputs and synaptic competition mechanism. Based on the synaptic outputs after the synaptic competition and the neuronal spikes, the learning mechanism depicted in FIG. 18 adjusts the synaptic weights wji. In 1-PCM case, the weight change is realized by a write pulse generator, such as one depicted in FIG. 17.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A neuromorphic computing system comprising a plurality of spiking neurons, each with a plurality of synapses and corresponding synaptic weights, the system further comprising a synaptic competition mechanism in connection with a spike-based learning mechanism based on spikes perceived behind a synapse, wherein synapses of different neurons connected to the same input compete for that input and, based on the result of that competition, each neuron of the neural network develops an individual perception of the presented input spikes, the perception used by the learning mechanism to adjust the synaptic weights, the system further comprising a learning mechanism having one or more hardware circuits configured to utilize perception to adjust the synaptic weights by a procedure in which the synapses corresponding to the perceived input spikes are depressed when a neuron does not spike, and synapses corresponding to the perceived input spikes are potentiated when a neuron spikes.

2. The system according to claim 1 wherein the learning mechanism adjusts the synaptic weights according to $$\Delta w_{ji} = \begin{cases} f_+(w_{ji}, \Delta t_{ji}) & \text{if } \Delta t_{ji} = 0 \\ f_-(w_{ji}, \Delta t_{ji}) & \text{if } \Delta t_{ji} \neq 0 \end{cases}$$

on occurrence of a neuronal spike and $$\Delta w_{ji} = \begin{cases} f_-(w_{ji}, \Delta t_{ji}) & \text{if } \Delta t_{ji} = 0 \\ 0 & \text{otherwise} \end{cases}$$

on lack of a neuronal spike, where
$\Delta w_{ji}$=an increment of weight $w_{ji}$
$\Delta t_{ji} = t_j^{post} - t_{ji}^{PSP}$
$f_+(w_{ji}, \Delta t_{ji})$=a potentiation function
and
$f_-(w_{ji}, \Delta t_{ji})$=a depression function.

3. The system according to claim 2 wherein the learning mechanism utilizes an adjustable neuronal threshold $V_j^{th}$ or $V_{th,j}$, which is adjusted according to
$V_j^{th} = p \cdot TPSP_j$ on occurrence of a neuronal spike and
$V_j^{th} = V_j^{th} - p \cdot TPSP_j$ on lack of a neuronal spike,
where
$V_j^{th}$ or $V_{th,j}$=said adjustable neuronal threshold,
p=is a real number with $0 \leq p \leq 1$
and
$TPSP_j = \Sigma q_{ji}$
with $q_{ji}$=synaptic output of synapse with weight $w_{ji}$.

4. The system according to claim 3 wherein the learning mechanism performs a method comprising:
starting from an empty network in which all neurons are disabled, enabling a neuron and designating the neuron as a current overflow neuron;
initializing the synaptic weights of the current overflow neuron to a non-zero value;
initializing the neuronal threshold of the current overflow neuron to the size of the smallest feature to be captured; and
when the current overflow neuron spikes, designating the overflow neuron as a regular neuron in the neural network, and designating a next neuron as the current overflow neuron.

5. A method for feature learning in a neuromorphic computing system having a plurality of spiking neurons, each with a plurality of synapses and corresponding synaptic weights, the method comprising:
starting from an empty network in which all neurons are disabled, enabling a neuron and designating the neuron as a current overflow neuron;
initializing the synaptic weights of the current overflow neuron to a non-zero value;
initializing the neuronal threshold of the current overflow neuron to the size of the smallest feature to be captured; and
when the current overflow neuron spikes, designating the overflow neuron as a regular neuron in the neural network, and designating a next neuron as the current overflow neuron.

6. The method of claim 5, further comprising:
adjusting the synaptic weights $w_{ji}$ using input perception according to $$\Delta w_{ji} = \begin{cases} f_+(w_{ji}, \Delta t_{ji}) & \text{if } \Delta t_{ji} = 0 \\ f_-(w_{ji}, \Delta t_{ji}) & \text{if } \Delta t_{ji} \neq 0 \end{cases}$$

on occurrence of a neuronal spike and $$\Delta w_{ji} = \begin{cases} f_-(w_{ji}, \Delta t_{ji}) & \text{if } \Delta t_{ji} = 0 \\ 0 & \text{otherwise} \end{cases}$$

on lack of a neuronal spike, wherein
$\Delta w_{ji}$=an increment of weight $w_{ji}$
$\Delta t_{ji} = t_j^{post} - t_{ji}^{PSP}$
$f_+(w_{ji}, \Delta t_{ji})$=a potentiation function and $f_-(w_{ji}, \Delta t_{ji})$ = a depression function.

7. The method of claim 6, wherein the neuromorphic computing system uses an adjustable neuronal threshold $V_j^{th}$, the method further comprising adjusting the neuronal threshold according to $V_j^{th} = p \cdot TPSP_j$ on occurrence of a neuronal spike and
$V_j^{th} = V_j^{th} - p \cdot TPSP_j$ on lack of a neuronal spike,
where
$V_j^{th}$ or $V_{th,j}$ = said adjustable neuronal threshold,
p = is a real number with 0≤p≤1
and
$TPSP_j = \Sigma q_{ji}$
with $q_{ji}$ = synaptic output of synapse with weight $w_{ji}$.

8. A learning mechanism for a spiking neural network comprising a plurality of spiking neurons, each with a plurality of synapses and corresponding synaptic weights, the learning mechanism being a spike-based learning mechanism based on spikes perceived behind a synapse, the learning mechanism comprising one or more hardware circuits configured to perform a method comprising:
- starting from an empty network, in which all neurons are disabled, enabling a neuron, chosen at random, and designating this neuron as a current overflow neuron;
- initializing the synaptic weights of the current overflow neuron to a non-zero value;
- initializing the neuronal threshold of this current overflow neuron to the size of the smallest feature to be captured; and
- when the current overflow neuron spikes, designating the overflow neuron as a regular neuron in the neural network, and designating a next neuron, randomly chosen, as the current overflow neuron.

9. The learning mechanism for a spiking neural network according to claim 8 that utilizes input perception to adjust the synaptic weights $w_{ji}$ according to $$\Delta w_{ji} = \begin{cases} f_+(w_{ji}, \Delta t_{ji}) & \text{if } \Delta t_{ji} = 0 \\ f_-(w_{ji}, \Delta t_{ji}) & \text{if } \Delta t_{ji} \neq 0 \end{cases}$$

on occurrence of a neuronal spike and $$\Delta w_{ji} = \begin{cases} f_-(w_{ji}, \Delta t_{ji}) & \text{if } \Delta t_{ji} = 0 \\ 0 & \text{otherwise} \end{cases}$$

on lack of a neuronal spike, where
$\Delta w_{ji}$ = an increment of weight $w_{ji}$
$\Delta t_{ji} = t_j^{post} - t_{ji}^{PSP}$
$f_+(w_{ji}, \Delta t_{ji})$ = a potentiation function
and
$f_-(w_{ji}, \Delta t_{ji})$ = a depression function.

10. The learning mechanism for an artificial spiking neural network according to claim 8 that utilizes an adjustable neuronal threshold $V_j^{th}$, which is adjusted according to
$V_j^{th} = p \cdot TPSP_j$ on occurrence of a neuronal spike and
$V_j^{th} = V_j^{th} - p \cdot TPSP_j$ on lack of a neuronal spike,
where
$V_j^{th}$ or $V_{th,j}$ = said adjustable neuronal threshold,
p = is a real number with 0≤p≤1
and
$TPSP_j = \Sigma q_{ji}$
with $q_{ji}$ = synaptic output of synapse with weight $w_{ji}$.

* * * * *